United States Patent [19]

Roe et al.

[11] Patent Number: 5,079,036

[45] Date of Patent: Jan. 7, 1992

[54] METHOD OF INHIBITING FREEZING AND IMPROVING FLOW AND HANDLEABILITY CHARACTERISTICS OF SOLID, PARTICULATE MATERIALS

[75] Inventors: Donald C. Roe, Tabernacle, N.J.; David M. Polizzotti, Yardley, Pa.

[73] Assignee: Betz Laboratories, Inc., Trevose, Pa.

[21] Appl. No.: 558,941

[22] Filed: Jul. 27, 1990

[51] Int. Cl.$^5$ .................................................. B05D 7/24
[52] U.S. Cl. ........................................ 427/212; 427/215; 427/220; 106/13; 252/70
[58] Field of Search .................. 427/212, 220, 215; 252/70, 73, 74, 75, 76, 78.1, 79, 352, 353, 355, 357, DIG. 7, 77; 106/13

[56] References Cited

U.S. PATENT DOCUMENTS

| | | | |
|---|---|---|---|
| 3,350,314 | 10/1967 | Dawtrey et al. | 252/70 |
| 3,563,461 | 2/1971 | Cole, Jr. et al. | 239/9 |
| 3,811,660 | 5/1974 | Cole, Jr. | 261/18 |
| 3,847,571 | 11/1974 | Cole, Jr. | 55/87 |
| 4,000,992 | 1/1977 | Cole, Jr. | 55/87 |
| 4,117,214 | 9/1978 | Parks et al. | 427/228 |
| 4,207,202 | 6/1980 | Cole, Jr. | 252/359 |
| 4,304,798 | 12/1981 | Clapp et al. | 427/220 |
| 4,400,220 | 8/1983 | Cole, Jr. | 134/18 |
| 4,410,599 | 10/1983 | Roe et al. | 252/70 |
| 4,426,409 | 1/1984 | Roe | 427/221 |
| 4,470,827 | 9/1984 | Kekish et al. | 44/6 |
| 4,474,680 | 10/1984 | Kroll | 252/307 |
| 4,501,775 | 2/1985 | Parks et al. | 427/220 |
| 4,532,067 | 7/1985 | Padron et al. | 252/174.17 |
| 4,544,494 | 10/1985 | Downey et al. | 252/174.17 |
| 4,551,261 | 11/1985 | Salihar | 252/88 |
| 4,561,905 | 12/1985 | Kittle | 134/25.1 |
| 4,585,571 | 4/1986 | Bloom | 252/70 |
| 4,594,076 | 6/1986 | Blake et al. | 44/6 |
| 4,599,188 | 7/1986 | Llenado | 252/174.17 |
| 4,666,741 | 5/1987 | Roe | 427/220 |
| 4,780,143 | 10/1988 | Roe | 106/102 |
| 4,780,233 | 10/1988 | Roe | 252/88 |
| 4,796,702 | 1/1989 | Scherubel | 252/8.551 |
| 4,874,641 | 10/1989 | Kittle | 427/244 |
| 4,897,218 | 1/1990 | Roe | 252/313.1 |

FOREIGN PATENT DOCUMENTS

| | | | |
|---|---|---|---|
| 57-167375 | 10/1982 | Japan | 252/70 |
| 60-195178 | 10/1985 | Japan | 252/70 |
| WO87/04450 | 7/1987 | PCT Int'l Appl. | 252/73 |

Primary Examiner—Shrive Beck
Assistant Examiner—Terry J. Owens
Attorney, Agent, or Firm—Alexander D. Ricci; Bruce E. Peacock

[57] ABSTRACT

A stable foam having foam bubble diameters of 0.005–0.015 inches and being comprised of from about 10–30 wt. % of a brine freeze control agent selected from the group consisting of sodium chloride, calcium chloride, magnesium chloride, potassium chloride, borax, potassium thiocyanate, potassium acetate, sodium acetate, and sodium nitrite, anionic surfactant, amphoteric surfactant, and water is applied to solid, particulate materials such as coal or mineral ores to inhibit freezing and improve handleability characteristics of the particulate materials. The foam optionally may contain additional freeze control agents such as ethylene glycol or cellulose ethers.

19 Claims, No Drawings

METHOD OF INHIBITING FREEZING AND IMPROVING FLOW AND HANDLEABILITY CHARACTERISTICS OF SOLID, PARTICULATE MATERIALS

FIELD OF THE INVENTION

The present disclosure pertains to methods for providing a foamed treatment to solid particles, such as coal and mineral ores, to inhibit freezing thereof to facilitate handling and transport of the solid particulate materials in sub-freezing climates. Aqueous freeze control compositions, adapated for ready foam formation, are also disclosed.

BACKGROUND OF THE INVENTION

In sub-freezing temperatures, moisture entrapped in coal, mineral ores, or in other solid, particulate materials freezes rendering handling and transport of the materials difficult. When this occurs, special handling equipment must be used to thaw or break the agglomerated mass of solid particles and ice so as to allow for subsequent transport or processing. Problems encountered include difficulty in unloading rail cars and trucks carrying such frozen materials. Conveyors and transfer chutes, etc., that are designed for transport of the solid particles can become clogged or inoperable due to these freeze-related problems.

PRIOR ART

In order to alleviate problems of the above nature, a variety of chemical treatments adapted to reduce the cohesive and adhesive strength of ice or to retard ice crystal growth have been proposed. For example, liquid sprays employing polyhydroxy compounds, such as ethylene glycol have been proposed, for example, in U.S. Pat. No. 4,117,214 (Parks et al). Other liquid sprays for controlling freeze rate or ice strength include brine solutions, sodium sorbitol borate solutions—U.S. Pat. No. 4,304,798 (Clapp et al); and cationic polymers—U.S. Pat. No. 4,426,409 (Roe). Other liquid sprays suggested for freeze control purposes include those reported in U.S. Pat. No. 4,470,827 (Kekish); U.S. Pat. No. 4,501,775 (Parks et al); U.S. Pat. No. 4,594,076 (Blake et al); and U.S. Pat. No. 4,666,741 (Roe).

One problem encountered in the application of a liquid spray for freeze control purposes is that it is virtually impossible to evenly distribute the desired amount (i.e., about 1–5 pints) of the freeze control agent uniformly over the entire surface of the solid particles. Uneven application leads to the formation of uneven spots in the spray distribution whereby, in some instances, localized ice formation is troublesome. On the other hand, in order to ensure uniform coating of the freeze control agent over the solid particles, spray operators are prone to use too much of the active ingredient, thus rendering the process economically unattractive.

Foamed treatments have been provided for controlling dust dissemination for quite some time. For example, dust and, specifically, respirable dust, is suppressed by foam comprising compressed air, water, and foaming agent in U.S. Pat. No. 4,400,220 (Cole). Improvements and disclosures related to the '220 patent include U.S. Pat. Nos. 3,811,660 (Cole); 4,000,992 (Cole); 4,207,202 (Cole); and 3,847,571 (Cole).

In U.S. Pat. No. 4,551,261 (Salihar), the generation of dust by coal and other solid particulate materials is suppressed by the application of a foam comprising water, foaming agent, and an elastomeric water insoluble polymer. Water insoluble elastomeric polymers are combined with oil and are sprayed or applied in foam form to suppress dust dissemination in U.S. Pat. No. 4,780,233 (Roe) with foams of oil and water being taught for dust dissemination control in U.S. Pat. No. 4,561,905 (Kittle).

Foams for cement clinker dust dissemination have been disclosed in U.S. Pat. Nos. 4,780,143 (Roe) and 4,897,218 (Roe) with foam being suggested to form a barrier layer overlying landfill wastes and the like in U.S. Pat. No. 4,874,641 (Kittle).

In U.S. Pat. No. 3,563,461 (Cole), foams are taught as being useful in providing an insulating blanket to protect crops from freezing, with glycol based foamed formulations being applied to de-ice/defrost external aircraft surfaces in U.S. Pat. No. 3,350,314 (Dawtrey et al).

Despite the prior art efforts, there remains a need in the art to provide an effective method for providing distribution of freeze control or freeze modifying agents uniformly over a mass of solid particles, such as coal or mineral ores like iron and copper ore.

SUMMARY OF THE INVENTION

Foamed formulations comprising freeze control agents applied to solid, particulate masses provide even distribution of the freeze control agent to the mass in an economically attractive fashion and demonstrate improved performance over liquid spray techniques. Even inexpensive brine materials can be effectively provided in foam form. Heretofore, foaming of same was thought almost impossible due to their highly ionic nature and incompatibility with organic foam forming surfactants.

In order to form the desired foam, an anionic or an amphoteric surfactant is utilized to provide a stable foam base for application of the freeze control agent. Foam stability is further enhanced by conjoint use of both the anionic surfactant and the amphoteric surfactant. From about 0.5–5 pints of foamed, freeze control agent are distributed over the solid particles, per ton of solids.

DETAILED DESCRIPTION OF THE PREFERRED EMBODIMENT

In accordance with the invention, freeze control agents are applied, in foam form, to the solid particulate materials for which treatment is desired. Typical solid, particulate materials include coal and mineral ores, such as iron and copper ore. Also, gravel, sand, etc., can be beneficially treated in accordance with the invention. These solid materials are usually stored in piles that are exposed to ambient conditions prior to or after transport on conveyors or in open truck beds or rail cars. The thus exposed solid particles retain moisture and, when the temperature drops below freezing, the particles are bound together by the ice formed throughout the particulate matrix to impair ease of handling and conveying.

As is used herein, the phase "freeze control agent" signifies a chemical treatment that, when applied to the solid particulate materials described above, helps to prevent same from freezing and improves handleability and flow characteristics of the solid particles. The thus treated particles can be more readily conveyed, transported, and handled. Although applicants are not bound to any particular theory, it is thought that the freeze control agents act to reduce the strength of the ice formed during cold weather conditions or act to reduce the ice crystal growth rate.

As to the freeze control agents that may be used, it is preferred to utilize a brine solution, such as a sodium chloride, calcium chloride, magnesium chloride, potassium chloride, borax, potassium thiocyanate, potassium or sodium acetate, or sodium nitrite. Of this group, calcium chloride is presently preferred.

Polyhydroxy compounds or monoalkylethers or dialkylethers thereof can also be used as effective freeze control agents either by themselves, or more preferably, conjointly with the brines. Ethylene glycol, propylene glycol, diethylene glycol, triethylene glycol, tetraethylene glycol, dipropylene glycol, tripropylene glycol, glycerine, sugar and mixtures thereof are exemplary polyhydroxyalkanes. The "Cellosolve" TM series of mono and dialkyl ethers of ethylene glycol may also be included. Specific members of the "Cellosolve" TM series include ethylene glycol monobutyl ether, ethylene glycol monobutyl ether acetate, ethylene glycol monoethyl ether acetate, ethylene glycol monoethyl ether, ethylene glycol dibutyl ether, ethylene glycol monohexyl ether, ethylene glycol monomethyl ether, ethylene glycol monomethyl ether acetate, and ethylene glycol monophenyl ether.

Of the variety of polyhydroxy compound freeze control agents that may be used, economic considerations presently dictate that ethylene glycol is preferred. Diethylene glycol and/or propylene glycol blended products are also quite acceptable.

Another class of effective freeze control agents that may be mentioned are cellulose derivatives. These may include either the anionic and/or non-ionic cellulose ether materials, such as sodium carboxymethyl cellulose and ethyl hydroxyethyl cellulose, respectively. These cellulose derivatives refer to cellulose ethers in which some of the H atoms of the hydroxy functional groups of the cellulose molecule are replaced. Depending upon the functional nature of the replacement, the cellulose ethers can be anionic wherein some of the H atoms are replaced by ionic functional groups, such as carboxy lower alkyl groups (i.e., $-O-(CH_2)_xCOO^-Na^+$-carboxymethylcellulose preferred) or the H atoms may be substituted with non-ionic groups, such as alkyl, or hydroxylated alkyl groups (such as in ethyl cellulose—$OCH_2CH_3$ or hydroxy ethyl cellulose—$OCH_2CH_2OH$). The various OH groups on the cellulose polymer may comprise mixed substituents such as, for example, ethyl, hydroxyethylcellulose.

All of these anionic and non-ionic cellulose ethers are well-known and all commercially available.

In addition to the freeze control agent, addition of an anionic or amphoteric surfactant provides for stable foam formation. In this regard, suitable anionic surfactants include alkyl aryl sulfonic acids, alkyl sulfonic acids, alkenyl sulfonic acids, sulfonated alkyls, sulfonated alkyl ethers, sulfonated alkenyls, sulfated fatty esters. The term anionic surfactants is to be broadly construed so as to include the anionic detergents, such as the long chain alpha olefin sulfonates, water soluble salts of alkenyl sulfonic acid, such as the sodium salt of $C_{14}$-$C_{18}$ alpha olefin sulfonates; water soluble alkyl aryl sulfonic acid salts, such as sodium alkylnaphthalene sulfonate and sodium alkyl benzene sulfonate; water soluble salts of lauryl sulfate. Particularly preferred anionic surfactants comprise the alkylether sulfates and alcohol ether sulfates. "Stepasol CA-207" from Stepan Chemicals is especially preferred. This product is available from Stepan Chemicals and is classified as an ammonium salt of an alkyl ether sulfate. Additionally, "Witcolate 1247H" may be noted. This material is available from Witco and is referred to as an alkylether sulfate.

In addition to the anionic surfactant, the use of amphoteric surfactants has proven beneficial for stable foam production. These include betaine derivatives, such as coco betaine, coco amido betaine, coco imadazoline betaine, coco amido alkyl betaine, alkyl betaine, fatty acid amido alkyl betaine, and stearyl betaine. Additionally, other exemplary classes of amphoteric surfactants include alkylolamine salts of an alkylamino acid, and tertiary alkylamine oxide type surfactants that are all commercially available. An especially preferred amphoteric surfactant is sold under the name Emcol 6825 by Witco. It is classified as a coco amido sulfobetaine amphoteric surfactant.

Preferably, both the anionic and amphoteric surfactants are used in combination. The freeze control agent, and anionic and/or amphoteric surfactants are provided as an aqueous composition that is supplied to the foaming site. The product is then simply mixed with air to form foam.

With respect to the freeze control compositions, ready for foaming, the following are exemplary:

|  | Freeze Control Agent | Surfactants | Water |
| --- | --- | --- | --- |
| broad range | 10-500 | 1 | remainder |
| preferred range | 25-250 | 1 | remainder |

SURFACTANT RATIO

Of the total surfactant present, anionic surfactant product to amphoteric surfactant (when both are present) product should be present in a ratio by weight of 1-10:1, preferably 4-5:1.

The following two formulations are preferred.

| Formulation One | |
| --- | --- |
| $CaCl_2$ | 25 parts |
| Anionic Surfactant | .4 parts |
| Amphoteric Surfactant | .1 part |
| Remainder water | |

| Formulation Two | |
| --- | --- |
| Ethylene Glycol | 25 parts |
| $CaCl_2$ | 25 parts |
| Anionic Surfactant | .4 parts |
| Amphoteric Surfactant | .1 part |
| Remainder Water | |

Aqueous solutions or dispersions comprising 10-30% (wt.) brine may be foamed in accordance with the invention.

With respect to foam formation, air is preferred for use as the foam forming gas. Details of the foam forming process are not critical to the invention. Generally, foam may be produced as stated in U.S. Pat. No.

4,400,200 (Cole), the disclosure of which is incorporated herein. Typically, the aqueous-based freeze control product is mixed with air at a ratio of about 1 gallon liquid with from 1-100, preferably 1-10, scf air. The air and liquid may combine at a point immediately upstream from mixing chamber. The mixing chamber may be a packed column, venturi or static mixer. The purpose of the mixing chamber is to induce the air in liquid dispersion defined as foam. Acceptable foam properties include expansion ratios (volume foam: volume of liquid product) on the order of about 10-100. Desirable foam bubble diameters are on the order of about 0.005-0.015 inch. It is important that from about 0.5-5, preferably about 3 pints of active freeze control agent be applied, via foaming, to the desired solid particulate material per ton of that material.

The foamed freeze control agent and surfactant composition should be applied to the solid particulate material in need of such treatment prior to transport in or exposure to sub-freezing conditions. Typical application locations would include areas of mixing or turbulence, such as in screw conveyors, conveyor transfer points, etc.

EXAMPLES

Example One

A field evaluation at a western location bituminous coal mine was made in which a glycol/salt based freeze control agent was applied in both liquid spray and foam form to compare performance. The freeze control agent, in either liquid spray or foam form, was applied to the coal prior to loading of same in a rail car. Observations were then made during subsequent car unloading, with the results clearly showing the benefit of foam application compared to liquid spray application. Results are summarized in Table One.

TABLE One

| Treatment | Application Method-Spray or Foam | Feed Rate (active freeze control agent) pts./ton solids | Observation |
| --- | --- | --- | --- |
| (control) | — | — | coal frozen on slopes and sides of rail cars |
| A | Liquid Spray | 3.0 | same as control |
| A + 5% B | Foam | 3.0 | no coal on slopes; bare spots on side walls |
| A + 5% B | Foam | 2.5 | no coal on slopes; bare spots on side walls |
| A + 5% B | Foam | 2.0 | no coal on slopes; bare spots on side walls |
| A + 5% B | Foam | 1.0 | coal frozen on slopes and sides of rail cars, but slightly less than control |

A a blend of ethylene glycol and propylene glycol with a minor amount of sodium acetate present
B a foam forming combination comprising Steposol CA-207, available Stepan, described as an ammonium salt of an alkyl ether sulfate (i.e., an anionic surfactant), and an amphoteric surfactant, Emcol 6825 described as a coco amido sulfobetaine type surfactant, available from Witco in a ratio of active anionic:active amphoteric of about 4:1.

The data illustrate that as little as 1.0 pt/ton of foamed freeze control agent had a visible effect on rail car freezing, whereas 3.0 pt/ton of the freeze control agent, when applied in liquid spray form has no effect compared to the control.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. Method of inhibiting freezing and improving flow and handleability characteristics of solid, particulate materials comprising:
    forming a stable foam having foam bubble diameters of 0.005-0.015 inches, said foam comprising from about 10-30 wt. % of a brine freeze control agent selected from the group consisting of sodium chloride, calcium chloride, magnesium chloride, potassium chloride, borax, potassium thiocyanate, potassium acetate, sodium acetate, and sodium nitrite, anionic surfactant, amphoteric surfactant and water, and
    contacting said solid, particulate materials with said stable foam.

2. Method as recited in claim 1 comprising contacting said solid, particulate materials with about 0.5-5 pints of said freeze control agent per ton of said solid, particulate materials.

3. Method as recited in claim 1 wherein said anionic surfactant is present in an amount of from 1-5 parts by weight per part by weight of said amphoteric surfactant.

4. Method as recited in claim 3 wherein said anionic surfactant comprises an alkyl ether sulfate.

5. Method as recited in claim 3 wherein said amphoteric surfactant comprises a betaine derivative selected from the group consisting of coco betaine, coco amido betaine, alkyl betaine, coco imadozoline betaine, coco amido alkyl betaine, fatty acid amido alkyl betaine, and stearyl betaine surfactants.

6. Method as recited in claim 1 wherein said brine comprises calcium chloride.

7. Method as recited in claim 1 wherein said foam further comprises a polyhydroxyalkane or mono- or di-alkyl ether thereof as a freeze control agent.

8. Method as recited in claim 7 wherein said polyhydroxyalkane or mono- or di-alkyl ether thereof comprises a member selected from the group consisting of ethylene glycol, propylene glycol, diethylene glycol, triethylene glycol, tetraethylene glycol, dipropylene glycol, tripropylene glycol, glycerine, sugar and mixtures thereof.

9. Method as recited in claim 8 wherein said polyhydroxyalkane or mono- or di-alkyl ether thereof comprises ethylene glycol.

10. Method as recited in claim 1 wherein said foam further comprises a cellulose ether as a freeze controlage.

11. A method as recited in claim 10 wherein said cellulose ether comprises a member selected from the group consisting of anionic cellulosic ethers and non-ionic cellulose ethers.

12. A method as recited in claim 11 wherein said cellulose ether comprises an anionic cellulosic ether.

13. A method as recited in claim 12 wherein said anionic cellulosic ether comprises carboxyloweralkylcellulose.

14. A method as recited in claim 13 wherein said carboxyloweralkylcellulose comprises carboxymethylcellulose.

15. A method as recited in claim 11 wherein said non-ionic cellulose ether comprises a hydroxyalkylcellulose.

16. Method as recited in claim 1 comprising mixing said freeze control agent, surfactant, and water with air to form said foam, wherein about 1 gallon of said freeze control agent, surfactant and water combination is mixed with about 1-100 scf of air.

17. Method as recited in claim 16 comprising mixing about 1 gallon of said freeze control agent, surfactant, and water combination with about 1-10 scf air.

18. Method as recited in claim 1 wherein said freeze control agent is present in an amount of about 10-500 parts by weight based upon weight of said surfactant.

19. Method as recited in claim 18 wherein said freeze control agent is present in an amount of about 25-250 parts by weight based upon weight of said surfactant.

* * * * *